(12) United States Patent
Kastinger et al.

(10) Patent No.: US 11,608,235 B2
(45) Date of Patent: Mar. 21, 2023

(54) PRODUCT CARRIER

(71) Applicant: B&R INDUSTRIAL AUTOMATION GMBH, Eggelsberg (AT)

(72) Inventors: Christian Kastinger, St. Georgen b. Sbg. (AT); Philipp Rogner, Ternberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 17/254,647

(22) PCT Filed: Jun. 24, 2019

(86) PCT No.: PCT/EP2019/066616
§ 371 (c)(1),
(2) Date: Dec. 21, 2020

(87) PCT Pub. No.: WO2019/243630
PCT Pub. Date: Dec. 26, 2019

(65) Prior Publication Data
US 2021/0155422 A1    May 27, 2021

(30) Foreign Application Priority Data
Jun. 22, 2018 (EP) .................... 18179310

(51) Int. Cl.
*B65G 54/02* (2006.01)
(52) U.S. Cl.
CPC .................... *B65G 54/02* (2013.01)
(58) Field of Classification Search
CPC .................... B65G 54/02

USPC ........................................ 198/805
See application file for complete search history.

(56) References Cited

U.S. PATENT DOCUMENTS

| | | |
|---|---|---|
| 5,018,928 A | 5/1991 | Hartlepp |
| 7,134,258 B2 | 11/2006 | Kalany et al. |

(Continued)

FOREIGN PATENT DOCUMENTS

| | | |
|---|---|---|
| CN | 102414098 | 4/2012 |
| CN | 104066666 | 9/2014 |

(Continued)

OTHER PUBLICATIONS

Markus Springmann, "Auslegung eines asynchronen Langstatorlinearmotors mit großem Luftspalt als Straßenbahnantrieb", https://publikationen.bibliothek.kit.edu/1000048194/3703943 [retrieved on Aug. 22, 2019], DOI: 10.5445/KSP/1000048194, XP055614525, Jun. 9, 2015, pp. 27-29.

(Continued)

*Primary Examiner* — James R Bidwell
(74) *Attorney, Agent, or Firm* — Greenblum & Bernstein, P.L.C.

(57) ABSTRACT

In order to specify a flexible transport arrangement for a long stator linear motor which can be used more flexibly for the transport of products, a transport arrangement includes a transport unit and a product carrier. The transport unit and the product carrier each have at least one guide element arranged in the direction of movement and transport unit has drive magnets arranged in a direction of movement for driving the transport unit. The product carrier has no drive and is couplable to the transport unit via a coupling point and is drivable by the transport unit via the coupling point.

21 Claims, 2 Drawing Sheets

(56) References Cited

U.S. PATENT DOCUMENTS

Figure 1:
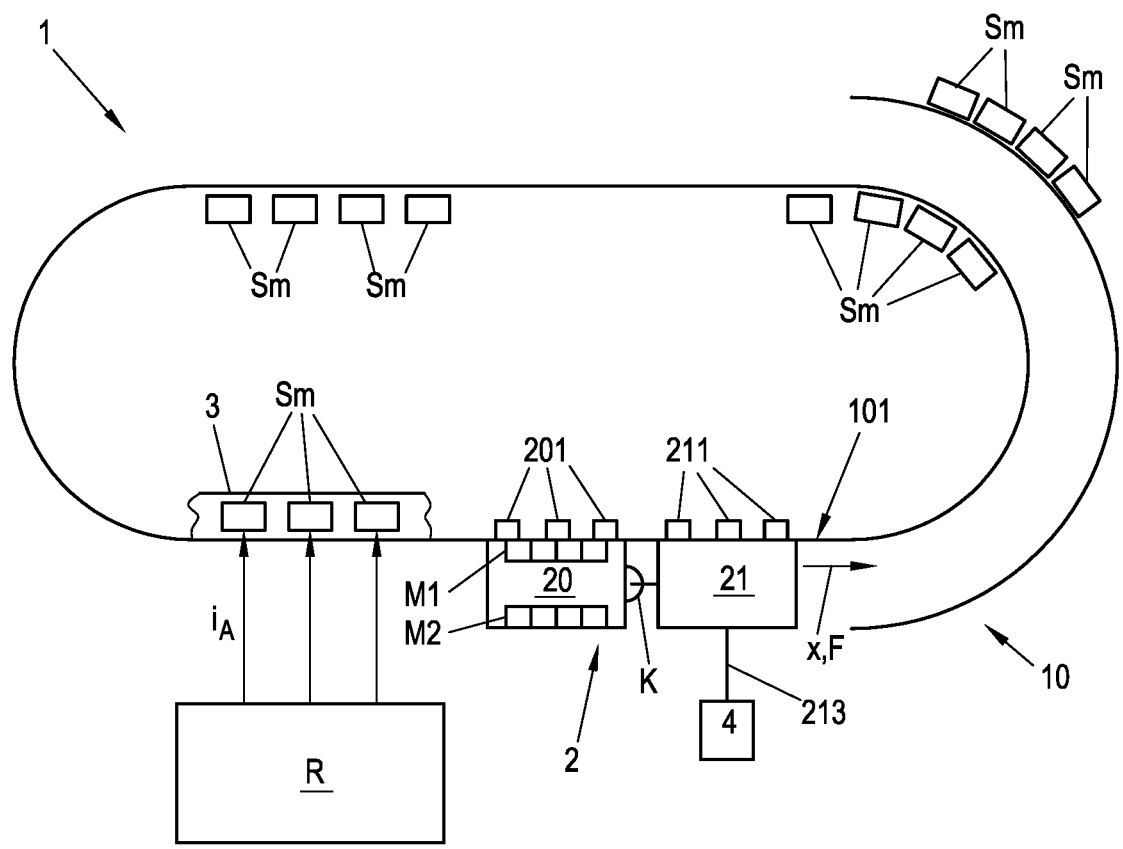

| | | | |
|---|---|---|---|
| 7,422,099 B2 * | 9/2008 | Reguzzi | B65G 23/23 |
| | | | 198/805 |
| 7,857,297 B2 * | 12/2010 | Ong | B65G 54/02 |
| | | | 270/52.16 |
| 8,096,409 B2 | 1/2012 | Wipf et al. | |
| 8,210,343 B2 * | 7/2012 | Lykkegaard | H02K 41/031 |
| | | | 198/805 |
| 9,051,132 B2 | 6/2015 | van de Loecht et al. | |
| 10,106,339 B2 | 10/2018 | Prüssmeier | |
| 10,554,102 B2 | 2/2020 | Weber et al. | |
| 2005/0263369 A1 | 12/2005 | Mendenhall | |
| 2009/0107806 A1 | 4/2009 | Mendenhall | |
| 2017/0029215 A1 | 2/2017 | Parodi et al. | |
| 2017/0247201 A1 | 8/2017 | Prüssmeier | |
| 2017/0341875 A1 | 11/2017 | Baechle | |
| 2017/0346379 A1 | 11/2017 | Weber et al. | |

FOREIGN PATENT DOCUMENTS

| | | | |
|---|---|---|---|
| CN | 105307960 | | 2/2016 |
| CN | 107082286 | | 8/2017 |
| CN | 107352236 | | 11/2017 |
| DE | 199 56 477 | A1 * | 5/2001 ............ B65G 54/02 |
| DE | 10 2014 117 150 | | 5/2016 |
| EP | 0 963 931 | | 12/1999 |
| EP | 2 704 968 | | 7/2007 |
| EP | 2 921 433 | | 9/2015 |
| EP | 3038959 | | 7/2016 |
| EP | 3 130 552 | | 2/2017 |
| EP | 3 251 986 | | 6/2017 |
| JP | 2007039237 | | 2/2007 |
| WO | 2005/110898 | | 11/2005 |
| WO | 2010/121875 | | 10/2010 |
| WO | 2013/110377 | | 8/2013 |
| WO | 2015/028212 | | 3/2015 |

OTHER PUBLICATIONS

Int'l Search Report (Form PCT/ISA/210) conducted in Int'l Appln. No. PCT/EP2019/066616 (dated Sep. 2, 2019).

Int'l Written Opinion (Form PCT/ISA/237) conducted in Int'l Appln. No. PCT/EP2019/066616 (dated Sep. 2, 2019).

China Office Action conducted in counterpart China Appln. No. 201980041903.5 (dated Jan. 17, 2022) (w/ translation).

* cited by examiner

PRODUCT CARRIER

The present invention relates to a transport arrangement for a long stator linear motor and a long stator linear motor comprising at least one transport arrangement.

A stator of a long stator linear motor (LLM) comprises a plurality of electrical drive coils which are arranged next to one another and are arranged in a stationary manner along a transport route. A number of magnets are arranged on a transport unit in the form of permanent magnets or as electrical coils or as a short-circuit winding. The magnets are usually attached to the transport unit in the direction of movement such that they can interact with the drive coils of the stator. The long stator linear motor can be in the form of a synchronous machine, both self-excited or externally excited, or in the form of an asynchronous machine. Owing to the interaction of the (electro)magnetic fields of the magnets and the drive coils, a propulsive force acts on the magnets of the transport unit, which in turn moves the transport unit in the direction of movement. This is done by activating the individual drive coils in order to regulate the magnetic flux, which influences the amount of the propulsive force. Long stator linear motors are increasingly being used as a replacement for conventional continuous conveyors or rotary-to-linear transmission units (e.g. rotary motor on conveyor belt, belts, chains, etc.) in order to meet the requirements of modern, flexible logistics units.

Generally, such long stator linear motors are usually arranged in one plane, and therefore the transport units are moved along a planar transport route. The transport route can be composed of transport segments in the form of curve segments, straight lines or also switches. A transport unit must, of course, be suitably guided along the transport route and held thereon. For this purpose, guide elements are provided which interact with route guide elements provided on the transport route. Any guide elements and route guide elements such as rollers, wheels, sliding elements, guiding surfaces, etc. can be used here.

With the help of long stator linear motors, efficient transport systems for loads or products can be implemented. The loads or products are normally attached to one or more transport units and moved along with them. US 2017/0341875 A1, U.S. Pat. No. 8,096,409 B2, 7,134,258 B2, EP 2 704 968 B1 show devices of this type in which products are moved by transport units along a transport route. However, products with special dimensions cannot be ideally moved by conventional transport units. Likewise, heavy products may possibly not be transported due to a predetermined maximum load of a transport unit.

It is therefore an object of the present invention to specify long stator linear motors and transport arrangements for long stator linear motors which can be used more flexibly for the transport of products.

According to the invention, this object is achieved in that a transport arrangement for a long stator linear motor comprises a transport unit and a product carrier, wherein the transport unit and the product carrier each have at least one guide element arranged in the direction of movement, wherein the transport unit has drive magnets arranged in one direction of movement for driving the transport unit and wherein the product carrier has no drive and is couplable to the transport unit via a coupling point and drivable by the transport unit via the coupling point. The product carrier is basically designed separately from the transport unit and has no drive, i.e. is not actuated. However, the product carrier can be driven by the transport unit via the coupling point. Thus, the transport order can also comprise a standard transport unit and a special product carrier that meets the requirements for product transport. The guide elements of the product carrier can be made more numerous and/or more robust with regard to the transport unit, which makes it possible to move greater loads over the product carrier. Couplable means that the product carrier is or can be coupled to the transport unit in a fixed or releasable manner via the coupling point. The product carrier can thus be driven by the transport unit. The product carrier is driven by the transport unit when it is coupled to the transport unit.

The transport arrangement can comprise at least one further product carrier which has at least one guide element arranged in the direction of movement, wherein the at least one further product carrier is couplable to the transport unit or the product carrier via at least one further coupling point and is drivable by the transport unit or the product carrier via the at least one further coupling point. The further product carrier can thus be coupled to the first product carrier or to the transport unit via the at least one further coupling point. It is thus possible to incorporate further product carriers into the transport arrangement, wherein the propulsive force is transmitted from the transport unit to the product carriers via the respective coupling points. Naturally, the further coupling points do not necessarily have to be identical to the first coupling point, even if this naturally increases the compatibility between product carriers and transport units and thus also the possible combinations of these.

The transport arrangement can also comprise at least one further transport unit which has at least one guide element arranged in the direction of movement, wherein the at least one further transport unit has further drive magnets arranged in a direction of movement for driving the further transport unit and wherein the product carrier is couplable via a further coupling point to the further transport unit and is drivable by the transport unit via the coupling point. A further transport unit can thus be included in the transport arrangement, whereby a propulsive force is transmitted to the product carrier via the respective coupling points from both the first transport unit and also the second transport unit. This is advantageous in the case of particularly heavy product carriers or in the case of product carriers that are designed to move particularly heavy products.

The transport arrangement can advantageously comprise at least one further product carrier which has at least one guide element arranged in the direction of movement, wherein the at least one further product carrier is couplable to the transport unit or to the product carrier via at least one further coupling point and is drivable by the transport unit or the product carrier via the at least one further coupling point, comprising at least one further transport unit which has at least one guide element arranged in the direction of movement, wherein the at least one further transport unit has further drive magnets arranged in one direction of movement for driving the further transport unit and wherein the product carrier or the at least one further product carrier is couplable to the further transport unit via a second further coupling point, and is drivable by the further transport unit via the second further coupling point. The transport arrangement can thus comprise any sequence of transport units and product carriers, wherein the transport units and product carriers in a sequence are couplable in each case via coupling points. The transport arrangement must, however, comprise at least one transport unit and at least one product carrier, wherein the at least one product carrier is not actuated and is pulled or pushed in the direction of movement by the at least one transport unit.

For all configurations, couplable can mean that the transport units and product carriers merely rest against one another. However, couplable can also mean that the product carrier and/or transport unit are also permanently or releasably coupled to one another, for example by means of a drawbar provided at the coupling point. A coupling can take place at the coupling point via a latching mechanism, which can be releasable via a release mechanism. The coupling can, for example, comprise a magnetic coupling, for example by means of permanent magnets, etc.

The product carrier and/or the further product carrier can be designed to be foldable in the direction of movement. This is particularly advantageous in the case of long product carriers, since it also enables the use of transport routes with smaller curve radii.

The product carrier and/or the further product carrier can comprise engagement elements which can be brought into engagement with a product and/or a load in order to better transport the particular product or the particular load. Of course, the transport unit itself can also have engagement elements.

A long stator linear motor with a transport route oriented in the direction of movement can comprise a transport arrangement according to the invention and also route guide elements that interact with the guide elements in order to guide the at least one transport arrangement along the transport route and with a number of drive coils which are arranged next to one another along the transport route and are designed to interact with the drive magnets to drive the at least one transport arrangement along the transport route. In order to drive a product carrier by a transport unit along the transport route, the product carrier is coupled to the transport unit on the transport route via the coupling point.

In this case, the long stator linear motor can have a first route guide element which interacts with at least one guide element of the transport unit and with at least one guide element of the product carrier.

The long stator linear motor can also additionally have a second route guide element which interacts with a second guide element of the product carrier. Thus, even greater loads, e.g. even heavier products, can be transported.

The long stator linear motor can have a first route guide element which has a guide element of the transport unit and a second route guide element which interacts with a guide element of the product carrier. The first guide element can, for example, be dimensioned for smaller loads and the second guide element can be dimensioned for larger loads. This is advantageous because the product carrier serves to transport the loads itself and the transport device primarily serves to provide the propulsive force. The first route guide element and the second route guide element can thus be designed differently. Furthermore, the guide element of the transport unit and the guide element of the product carrier can be designed differently. For example, the guide element of the transport unit can be dimensioned for smaller loads and the guide element of the product carrier can be dimensioned for larger loads and/or the first route guide element can be dimensioned for smaller loads and the second route guide element can be dimensioned for larger loads.

The coupling point via which the product carrier is coupled to the transport unit can be arranged next to the transport route, i.e. laterally on the transport unit, so that the product carrier is located laterally on the transport unit.

An embodiment is also conceivable in which the guide element of the product carrier does not interact with a route guide element of the long stator linear motor, but with an external element that is not associated with the long stator linear motor. For example, the guide element can roll as a roller onto an external element in the form of a surface instead of being guided by a route guide element associated with the long stator linear motor. If the coupling point is provided laterally on the transport unit, the product carrier can interact with the external element in addition to the transport route via the associated guide element.

A guide element of the product carrier, for example a roller, rail, etc., can also interact with an external element in the form of an external guide element, for example a roller, a rail, a roller table, etc. If the coupling point is provided laterally on the transport unit, the product carrier can be guided next to the transport route via its associated guide element through the external guide element.

If the external element is designed as an external guide element, a guide element on the product carrier itself can also be dispensed with. The product carrier can then roll or slide by itself and without its own guide element on the external guide element, for example a roller, a rail, a roller table, etc. If the coupling point is provided laterally on the transport unit, the product carrier can be guided next to the transport route via the external guide element.

A planar motor transport unit, for example, can be provided as the product carrier. Although this planar motor transport unit has no drive in relation to the long stator linear motor, it has magnetic coupling elements for coupling to a planar motor. In this way, for example, a planar motor transport unit can be brought into position as a product carrier with the aid of the transport unit on the planar motor.

Figure 2A:
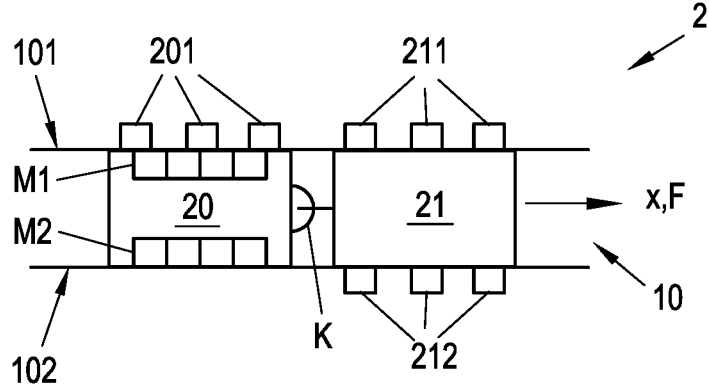
Figure 2B:
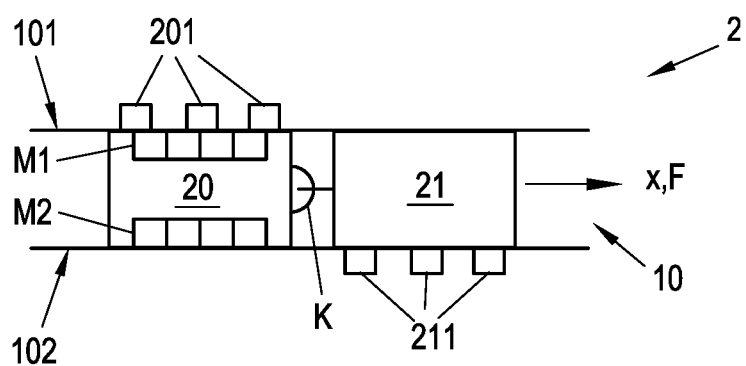
Figure 3A:
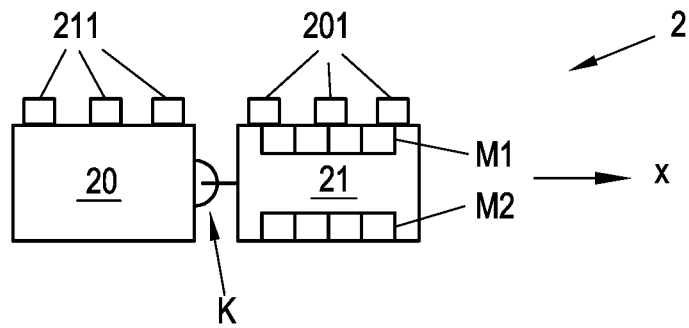
Figure 3B:
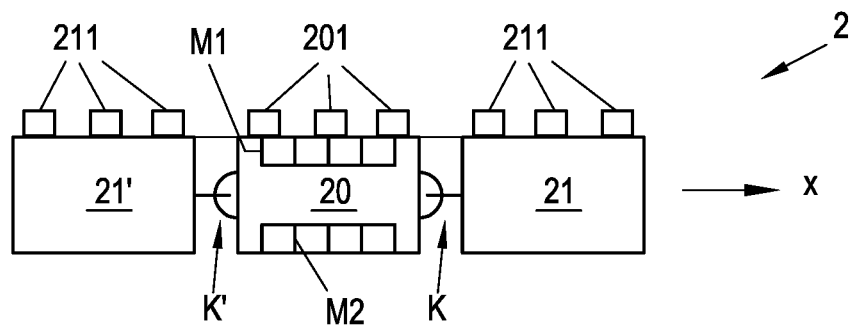
Figure 3C:
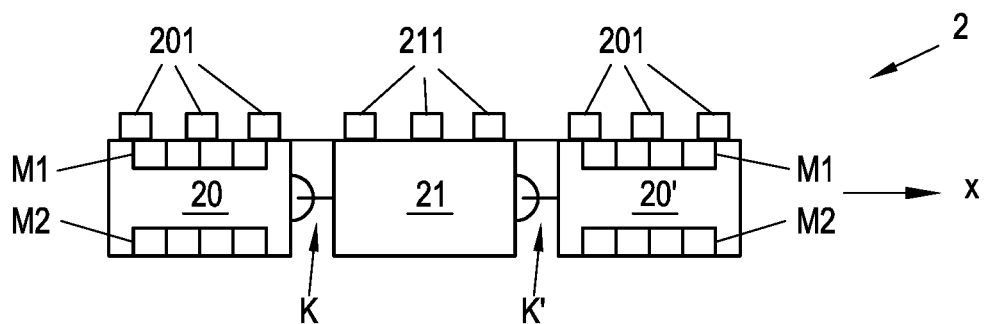
Figure 3D:
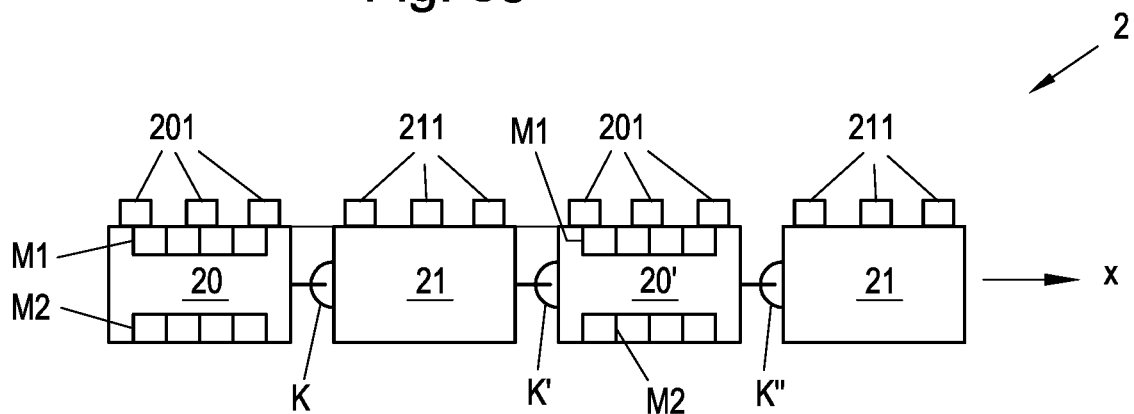

The present invention is described in greater detail below with reference to FIGS. 1 to 3*d* which show, by way of example, advantageous embodiments of the invention in a schematic and non-limiting manner. In the figures FIG. 1 shows a long stator linear motor with a section guide element for the guide elements of the product carrier and the transport unit, FIG. 2*a* shows a transport route with an additional second route guide element for at least one second guide element of the product carrier, FIG. 2*b* shows a transport route with a first route guide element for the guide elements of the transport unit and with a second route guide element for the guide elements of the product carrier FIG. 3*a* shows a transport arrangement with a transport unit and a product carrier, FIG. 3*b* shows a transport arrangement with a transport unit and two product carriers, FIG. 3*c* shows a transport arrangement with two transport units and a product carrier, FIG. 3*d* shows a transport arrangement with two transport units and two product carriers.

FIG. 1 is a simple example of a long stator linear motor 1. The long stator linear motor 1 is designed as a transport route 10, which is designed here to be closed. A plurality of drive coils Sm are arranged on the transport route 10 and, under the control of a control unit R (only shown for a few drive coils Sm), are energized with a coil current IA (as a vector in magnitude and direction) in order to generate a moving magnetic field. The drive coils Sm disposed next to one another in the direction of motion x are arranged on the transport route 10 on a stationary support structure 3 (only indicated in FIG. 1). A transport arrangement 2 according to the invention is shown by way of example, wherein several transport arrangements 2 are naturally provided on a long stator linear motor 1. The transport units 2 are moved along the transport route 10 in a direction of movement x, and are each guided in a suitable manner on the stationary transport route 10 via route guide elements 101. Of course, more than one transport arrangement 2 can be moved along the transport route 10, wherein each transport arrangement 2 can be moved (in direction, position, speed and acceleration) by appropriately energizing the drive coils Sm in the region of the transport unit 20 associated with the transport arrangement 2 independently of the other transport units 1. Depending on the application and requirement, the transport route 10 can have any shape, and can comprise closed and/or open route portions. The transport route 10 does not have to lie in one plane, but can also be arbitrarily guided in space. The fundamental operating principle of a long stator linear motor 1 is well known and therefore this will not be discussed further here.

A transport arrangement 2 comprises a transport unit 20 and at least one product carrier 21 which is couplable to the transport unit 20 at a coupling point K. The transport unit 20 has drive magnets M1, M2 which are arranged laterally in the direction of movement x and are used to drive the transport unit 20 by interacting with the drive coils Sm to generate a propulsive force F in the direction of movement x. The transport unit 20 can have drive magnets M1, M2 only on one side. It can also be provided, as shown in FIG. 1-3d, that in addition to the first number of magnets M1, a second number of magnets M2 are provided, advantageously opposite the first number of magnets M1, wherein the first and second numbers are advantageously identical. If the transport unit 20 has in each case a first number of magnets M1 and a second number of magnets M2 on two sides, drive coils Sm can be suitably provided on both sides of the transport route 10 (viewed in the direction of movement x) which interact with the respective magnets M1, M1 in order to cause a movement of the transport unit 20. For this purpose it is preferable for only the drive coils Sm in the region of the magnets M1, M2 to be energized, wherein this region can also comprise drive coils Sm which are located in front of and/or after the transport unit 20.

The product carrier 21 has no drive magnets M1, M2, but is couplable to the transport unit 20 via the coupling point K and thus is drivable by the transport unit 20. Thus, the product carrier 21 itself is without its own drive and therefore has no drive, that is to say that the product carrier 21 alone is not movable along the transport route 10. The transport unit 20, on the other hand, has its own drive, which results from the interacting drive magnets M1, M2 and drive coils Sm, and is therefore movable along the transport route 10 with this drive.

The transport unit 20 thus experiences a propulsive force F in the direction of movement x via the drive magnets M1, M2 interacting with drive coils Sm in the region of the drive magnets M1, M2 and transmits this propulsive force F to the product carrier 21 via the coupling point K. In this case, as shown in FIG. 1, the product carrier 21 can be located in front of or also behind the transport unit 20 in the direction of movement x. If the product carrier 21 is located in front of the transport unit 20 in the direction of movement, the transport unit 20 pushes the product carrier 21 in front of it and the coupling point K can be formed by the transport unit 20 resting against the product carrier 21. However, the coupling point K advantageously represents a fixed coupling which can also be designed to be releasable. Thus, a drawbar can be provided as the coupling point K, as is also indicated in FIG. 1-3d. Such a fixed or releasable coupling is particularly useful when the product carrier 21 is located behind the transport unit 20 in the direction of movement x in order to transmit the propulsive force from the transport unit 20 to the product carrier 21. The product carrier 21 here has engagement elements 213 which can be brought into engagement with a product 4. A product 4 can thus be transported in the direction of movement. Of course, the transport unit 20 can also have engagement elements, but the product carriers 21 are primarily provided for the transport of loads or products 4. For the sake of clarity, engagement elements 213 are not shown in the other figures.

At least one first guide element 201 is arranged on at least one side of the transport unit 20. As shown in FIG. 1, the at least one first guide element 201 can advantageously be located on the same side as the first number of magnets M1, but can also be located on another side of the transport arrangement 2. The at least one first guide element 201 can be arranged laterally on the transport unit 20, as shown in FIG. 1, and naturally can also extend in front of and/or behind and/or above and/or below the expanse of the transport unit 20. A plurality of first guide elements 201 are usually provided on one side, as also indicated in FIG. 1.

Likewise, at least one first guide element 211 is arranged on at least one side of the product carrier 21 and, as shown in FIG. 1, can be located laterally on the product carrier 21. An arrangement in front of and/or behind and/or above and/or below the extent of the product carrier 21 is also possible, wherein a plurality of first guide elements 211 are usually also provided on one side, as also indicated in FIG. 1.

In FIG. 1, the guide elements 201 of the transport unit 20 and the guide elements 211 of the product carrier 21 are located on the same side. Accordingly, on the transport route 10 a route guide element 101 is provided, which interacts with the guide elements 201 of the transport unit 20 and the guide elements 211 of the product carrier in order to guide the transport arrangement 2 along the transport route 10 in the direction of movement x.

FIG. 2a shows a section of a transport route 10 of a long stator linear motor which, as in FIG. 1, has a first route guide element 101 which interacts with the first guide elements 201 of the transport unit 20 and with at least one first guide element 211 of the product carrier 21. In addition, however, at least one second section guide element 102 is provided, which interacts with at least one second guide element 212 of the product carrier 21. Because the product carrier 21 is in engagement with a first route guide element 102 via at least one first guide element 211 and additionally with a second route guide element 102 via at least one second guide element 202, the product carrier 21 can also be used to transport heavy loads, for example, for which the first route guide element 101 alone is not designed. The second route guide element 102 is provided here only by way of example opposite the first route guide element 101, but can be located on any side, including on the same side. Analogously, the at least one second guide element 212 of the product carrier 21 is arranged only by way of example opposite the at least one first guide element 212 of the product carrier 21.

In FIG. 2b, a section of a transport route 10 of a long stator linear motor is shown, which has a first route guide element 101 which interacts with at least one guide element 201 of the transport unit 20. In addition, a second route guide element 102 is provided, which interacts with at least one guide element 211 of the product carrier 21. Here, too, the second route guide element 102 is provided only by way of example opposite the first route guide element 101. The first route guide element 101 can thus be designed for the requirements of the transport unit 20, i.e. for the requirements of the propulsive force F to be applied. The second route guide element 102, however, can be designed for the requirements of the product carrier 21, i.e. in particular for guiding heavy products 4 or heavy loads.

The guide elements 201, 202 of the transport unit 20, and also the guide elements 211, 212 of the product carrier 21, can be designed as rollers, wheels, sliding elements, guide surfaces, sliding surfaces, etc., wherein the route guide elements 101, 102 must of course be designed in such a way that the respective guide elements 201, 202, 211, 212 can be guided therein. The drive coils Sm are preferably arranged in the region of the route guide elements 101, 102, for example also on the support structure 3, in order to achieve a compact design. It is of course also conceivable that the drive coils Sm are located on other sides than the route guide elements 101, 102, so that naturally the magnets M1, M2 must also be attached to the sides of the drive coils Sm.

Any combination of first and second route guide elements 101, 102 is of course conceivable along the transport route, each of which elements can interact with guide elements 201, 202, 211, 212 of the transport units 20 and product carriers 21 as required. Thus, the transport route 10 can be equipped at least partially on two sides with route guide elements 101, 102, or at least partially a one-sided guide can be provided—even if the transport unit 20 or the product carrier 21 has guide elements 201, 202, 211, 212 on two sides.

FIG. 1 and FIG. 2a, 2b each show a transport arrangement 2 which is composed of a transport unit 20 and a product carrier 21 coupled to the transport unit 20 via a coupling point K, wherein the product carrier 21 is located in front of the transport unit 20 in the direction of movement. Transport unit 20 and product carrier 21 can be coupled, which means that they are coupled or can be coupled in a fixed or detachable manner. In the illustrated and preferred embodiment, transport unit 20 and product carrier 21 are shown coupled by way of example.

The transport arrangement 2 can of course be composed of a transport unit 20 with one product carrier 21 coupled to the transport unit 20 via a coupling point K and located behind the transport unit 20 in the direction of movement x, as shown in FIG. 3a.

Further transport arrangements 2 are shown in FIG. 3a-3d, wherein for reasons of clarity a representation of a long stator linear motor 2 or a transport route 10 is dispensed with, and by way of example guide units 211, 201 are provided only on one side. Of course, the transport arrangements 2, like those described above, are equally suitable for long stator linear motors 2, and arrangements of the guide units 211, 201 described above can also be provided.

FIG. 3b shows a transport arrangement 2 which, in addition to the transport unit 20 and the first product carrier 21, has a further product carrier 21'. The first product carrier 21 is coupled here to the transport unit 20 via a first coupling point and is located in front of the transport unit 20 in the direction of movement x. The further product carrier 21' is coupled to the transport unit 20 via a further coupling point K' and is located behind the transport unit 20 in the direction of movement x. The transport unit 20 thus transmits the propulsive force F via the coupling point K to the first product carrier 21 and via the further coupling point K' to the further product carrier 21'. The further product carrier 21' could of course also be coupled to the product carrier 21 via the further coupling point K'. In this case, the propulsive force F would be transmitted from the transport unit 20 via the coupling point K to the first product carrier 21 and from the first product carrier 21 via the further coupling point K' to the further product carrier 21'.

FIG. 3c shows a further embodiment of the transport arrangement 2, wherein a product carrier 21 is located between a first transport unit 20 and a further transport unit 21' and is coupled via a first coupling point K to the first transport unit 21 and via a further coupling point K' to the further transport unit 21'.

In FIG. 3d a transport arrangement consisting of a transport unit, a product carrier, a further transport unit 20' and a further product carrier 21' is shown, which are each coupled to one another via coupling points K, K', etc. It is thus conceivable as a transport arrangement 20 to have any sequence of couplable or coupled transport units 20 and product carriers 21 in the direction of movement x.

The invention claimed is:

1. A transport arrangement for a long stator linear motor comprising:
   a transport unit; and
   a product carrier,
   the transport unit and the product carrier each comprise at least one guide element arranged in the direction of movement,
   the transport unit has drive magnets arranged in a direction of movement for driving the transport unit, and
   the product carrier has no drive and is couplable to the transport unit via a coupling point and is drivable by the transport unit via the coupling point.

2. The transport arrangement according to claim 1, wherein the transport arrangement comprises at least one further product carrier which has at least one guide element arranged in the direction of movement, and
   wherein the at least one further product carrier has no drive and is couplable to the transport unit or the product carrier via at least one further coupling point and is drivable by the transport unit or the product carrier via the at least one further coupling point.

3. The transport arrangement according to claim 1, wherein the transport arrangement comprises at least one further transport unit which has at least one guide element arranged in the direction of movement,
   wherein the at least one further transport unit has further drive magnets arranged in a direction of movement for driving the further transport unit, and
   wherein the product carrier is couplable to the further transport unit via a further coupling point and is drivable by the at least one further transport unit via the at least one further coupling point.

4. The transport arrangement according to claim 2, wherein the transport arrangement comprises at least one further transport unit which has at least one guide element arranged in the direction of movement,
   wherein the at least one further transport unit has further drive magnets arranged in one direction of movement for driving the further transport unit, and
   wherein the product carrier or the at least one further product carrier is couplable to the further transport unit via a second further coupling point and is drivable by the further transport unit via the second further coupling point.

5. The transport arrangement according claim 1, wherein the product carrier or the further product carrier is designed to be foldable in the direction of movement.

6. The transport arrangement according to claim 1, wherein the product carrier and/or the further product carrier comprises engagement elements which can be brought into engagement with a product.

7. A long stator linear motor comprising:
at least one transport arrangement according to claim 1 with a transport route oriented in the direction of movement, having route guide elements which interact with the guide elements in order to guide the at least one transport arrangement along the transport route and with a number of drive coils arranged next to one another along the transport route, which are designed to interact with the drive magnets in order to drive the at least one transport arrangement along the transport route.

8. The long stator linear motor according to claim 7, wherein a first route guide element interacts with a guide element of the transport unit and with at least one guide element of the product carrier.

9. The long stator linear motor according to claim 8, wherein a second route guide element interacts with at least one second guide element of the product carrier.

10. The long stator linear motor according to claim 7, wherein the first route guide element interacts with at least one guide element of the transport unit and a second route guide element interacts with at least one guide element of the product carrier.

11. The transport arrangement according to claim 1, wherein the coupling point is arranged between a front of the product carrier and a rear of the transport unit or between a rear of the product carrier and a front of the transport unit.

12. The transport arrangement according to claim 11, wherein the coupling point is formed by the transport unit resting against the product carrier or comprises a drawbar so that the transport unit at least one of pushes or pulls the product carrier.

13. The transport arrangement according to claim 2, wherein the at least one further coupling point comprises a drawbar or is formed by the transport unit or the product carrier resting against the at least one further product carrier.

14. The transport arrangement according to claim 1, further comprising a second product carrier having no drive, the second product carrier being couplable to the transport unit via a second coupling point and being drivable by the transport unit via the second coupling point.

15. The transport arrangement according to claim 14, wherein, in a direction of travel, the coupling point is arranged between a front of the product carrier and a rear of the transport unit and the second coupling point is arranged between a rear of a second product carrier and a front of the transport unit.

16. The transport arrangement according to claim 15, wherein the coupling point arranged between a front of the product carrier and a rear of the transport unit comprises a drawbar and the second coupling point arranged between a front of the transport unit and a rear of the product carrier comprises a second drawbar or is formed by the front of the transport unit resting against the rear of the product carrier.

17. The transport arrangement according to claim 3, wherein the at least one further coupling point comprises a drawbar or is formed by the at least one further transport unit resting against the product carrier.

18. The transport arrangement according to claim 1, further comprising a second transport unit being couplable to the product carrier via a second coupling point, the product carrier being further drivable by the second transport unit via the second coupling point.

19. The transport arrangement according to claim 18, wherein, in a direction of travel, the coupling point is arranged between a front of the transport unit and a rear of the product carrier and the second coupling point is arranged between a rear of a second transport unit and a front of the product carrier.

20. The transport arrangement according to claim 19, wherein the coupling point arranged between the front of the transport unit and the rear of the product carrier comprises a drawbar or is formed by the front of the transport unit resting against the rear of the product carrier and the second coupling point arranged between the front of the product carrier and the rear of the transport unit comprises a second drawbar.

21. The long stator motor according to claim 7, wherein, in order to drive the product carrier along the transport route in a direction of travel, the coupling point arranged between the product carrier and the transport unit comprises a drawbar or is formed by the transport unit resting against the product carrier.

* * * * *